United States Patent
Hsiang (10) Patent No.: US 11,711,513 B2
(45) Date of Patent: Jul. 25, 2023

(54) METHODS AND APPARATUSES OF CODING PICTURES PARTITIONED INTO SUBPICTURES IN VIDEO CODING SYSTEMS

(71) Applicant: MEDIATEK INC., Hsinchu (TW)

(72) Inventor: Shih-Ta Hsiang, Hsinchu (TW)

(73) Assignee: HFI INNOVATION INC., Zhubei (TW)

(*) Notice: Subject to any disclaimer, the term of this patent is extended or adjusted under 35 U.S.C. 154(b) by 19 days.

(21) Appl. No.: 17/343,897

(22) Filed: Jun. 10, 2021

(65) Prior Publication Data

US 2021/0400270 A1 Dec. 23, 2021

Related U.S. Application Data

(60) Provisional application No. 63/037,598, filed on Jun. 11, 2020.

(51) Int. Cl.
| | |
|---|---|
| *H04N 19/119* | (2014.01) |
| *H04N 19/96* | (2014.01) |
| *H04N 19/105* | (2014.01) |
| *H04N 19/70* | (2014.01) |
| *H04N 19/172* | (2014.01) |

(52) U.S. Cl.
CPC ......... *H04N 19/119* (2014.11); *H04N 19/105* (2014.11); *H04N 19/172* (2014.11); *H04N 19/70* (2014.11); *H04N 19/96* (2014.11)

(58) Field of Classification Search
CPC .... H04N 19/172; H04N 19/96; H04N 19/119; H04N 19/105; H04N 19/70
See application file for complete search history.

(56) References Cited

U.S. PATENT DOCUMENTS

| | | | |
|---|---|---|---|
| 11,368,679 B2 | 6/2022 | Zheng et al. | |
| 2021/0136407 A1* | 5/2021 | Aono | H04N 19/55 |
| 2021/0195186 A1* | 6/2021 | Wu | H04N 19/119 |
| 2021/0329252 A1 | 10/2021 | Zheng et al. | |
| 2021/0360290 A1 | 11/2021 | Seregin | |
| 2021/0368208 A1 | 11/2021 | Samuelsson et al. | |

(Continued)

FOREIGN PATENT DOCUMENTS

| | | |
|---|---|---|
| CN | 110832868 A | 2/2020 |
| CN | 110832869 A | 2/2020 |

OTHER PUBLICATIONS

Chinese language office action dated Apr. 27, 2021, issued in application No. TW 110121364.

(Continued)

*Primary Examiner* — Neil R Mikeska
(74) *Attorney, Agent, or Firm* — McClure, Qualey & Rodack, LLP (57) ABSTRACT

Video processing methods and apparatuses include receiving input video data associated with a current picture composed of multiple Coding Tree Units (CTUs) for encoding or decoding, determining a number of subpictures, partitioning the current picture into one or more subpictures, and encoding or decoding each subpicture in the current picture. Each subpicture contains multiple complete CTUs and boundaries of each subpicture are aligned with grids of the current picture in units of CTUs. The number of subpictures in the current picture is limited by an allowed maximum number of slices.

14 Claims, 7 Drawing Sheets

(56) References Cited

U.S. PATENT DOCUMENTS

2022/0150487 A1* 5/2022 Lim .................... H04N 19/176
2022/0182681 A1* 6/2022 Paluri ................. H04N 19/176
2022/0217342 A1* 7/2022 Hannuksela ......... H04N 19/174

OTHER PUBLICATIONS

Bross, B., et al.; "Versatile Video Coding (Draft 8);" Joint Video Experts Team (JVET) of ITU-T SG 16 WP 3 and ISO/IEC JTC 1/SC 29/WG 11; Jan. 2020; pp. 1-514.
Non-Final Office Action dated Apr. 4, 2022, issued in U.S. Appl. No. 17/343,914.

* cited by examiner

CTU  Tile  Slice

METHODS AND APPARATUSES OF CODING PICTURES PARTITIONED INTO SUBPICTURES IN VIDEO CODING SYSTEMS

CROSS REFERENCE TO RELATED APPLICATIONS

The present invention claims priority to U.S. Provisional Patent Application Ser. No. 63/037,598, filed on Jun. 11, 2020, entitled "Methods and apparatus for coding subpictures". The U.S. Provisional Patent Application is hereby incorporated by reference in its entirety.

FIELD OF THE INVENTION

The present invention relates to video encoding or decoding methods and apparatuses. In particular, the present invention relates to encoding or decoding pictures partitioned into subpictures for video coding systems.

BACKGROUND AND RELATED ART

The High Efficiency Video Coding (HEVC) standard is an international video coding standard developed by the Joint Collaborative Team on Video Coding (JCT-VC) of ITU-T SG16 WP3 and ISO/IEC JTC1/SC29/WG11. The HEVC standard relies on a block-based coding structure which splits each video picture into multiple non-overlapped square Coding Tree Units (CTUs). A coded picture can be represented by a collection of slices, each comprising an integer number of CTUs. Each individual CTU in a slice is processed in a raster scanning order. In the HEVC main profile, the maximum and the minimum sizes of a CTU are specified by syntax elements signaled in a Sequence Parameter Set (SPS). A Bi-predictive (B) slice may be decoded using intra prediction or inter prediction with at most two motion vectors and reference indices to predict sample values of each block in the B slice. A Predictive (P) slice is decoded using intra prediction or inter prediction with at most one motion vector and reference index to predict sample values of each block in the P slice. An Intra (I) slice is decoded using intra prediction only.

Figure 1:
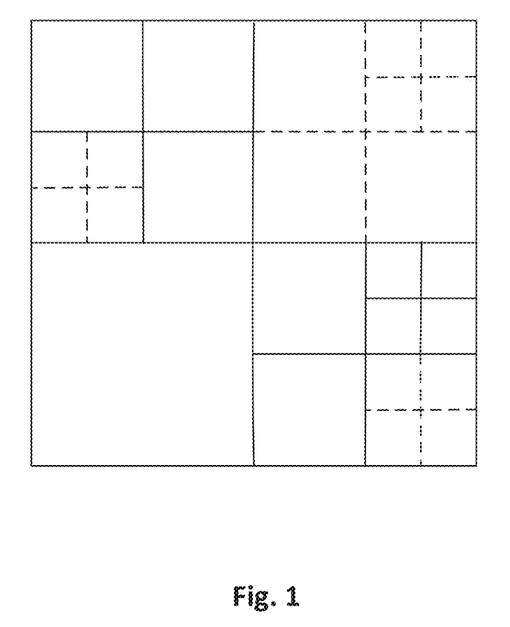
FIG. 1 illustrates an exemplary coding tree for splitting a Coding Tree Unit (CTU) into Coding Units (CUs) and splitting each CU into one or more Transform Units (TUs) according to a quadtree splitting structure.

Each CTU is further recursively partitioned into one or more non-overlapped Coding Units (CUs) using quadtree (QT) splitting structure in order to adapt various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure for a CTU is illustrated in FIG. 1, where the solid lines indicate CU boundaries in the CTU.

Figure 2:
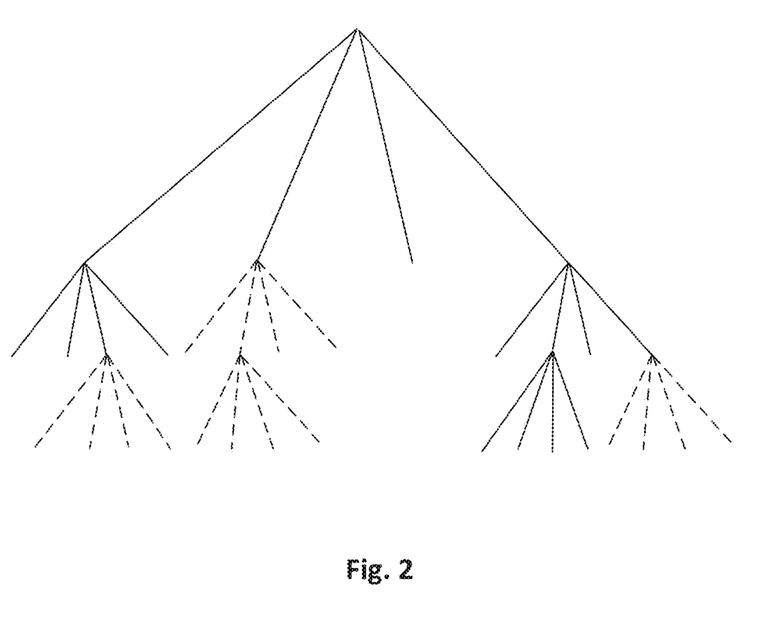
FIG. 2 illustrates a corresponding quadtree representation for the block partitioning structure as shown in FIG. 1.

Once the CTUs are partitioned into leaf CUs, each leaf CU is subject to further split into one or more Prediction Units (PUs) according to a PU splitting type for prediction according to the HEVC standard. Unlike the recursive quadtree splitting for CUs, each leaf CU may only be split once to form one or more PUs. The PU and associated CU syntax work as a basic representative block for sharing prediction information as the same prediction process is applied to all pixel samples in the PU. The specified prediction process is employed to predict the values of the associated pixel samples inside the PU. The prediction information is conveyed to the decoder on a PU basis. After obtaining residues generated by the prediction process based on the PU splitting type, the residues belonging to a leaf CU are partitioned into one or more Transform Units (TUs) according to a Residual quadtree (RQT) splitting structure for transforming the residues into transform coefficients for compact data representation. The dashed lines in FIG. 1 indicate TU boundaries in the CTU. The TU is a basic representative block for applying transform and quantization on the residual data or transform coefficients. A TU is composed of a Transform Block (TB) of luminance (luma) samples of size 8×8, 16×16, or 32×32 or four TBs of luma samples of size 4×4, and two corresponding TBs of chrominance (chroma) samples in a picture coded by a 4:2:0 color format. For each TU, a transform matrix having the same size as the TU is applied to the residues to generate transform coefficients, and these transform coefficients are quantized and conveyed to the decoder on a TU basis. FIG. 2 illustrates an example of a corresponding QT representation for the block partitioning structure as shown in FIG. 1. The solid lines indicate CU boundaries and the dashed lines indicate TU boundaries within the CTU.

The terms Coding Tree Block (CTB), Coding block (CB), Prediction Block (PB), and TB are defined to specify two-dimensional (2-D) sample array of one color component associated with the CTU, CU, PU, and TU respectively. For example, a CTU consists of one luma CTB, two chroma CTBs, and its associated syntax elements. A similar relationship is valid for CU, PU, and TU. In the HEVC standard, the same quadtree splitting structure is generally applied to both luma and chroma components unless a minimum size for the chroma block is reached.

The Versatile Video Coding (VVC) standard is the latest video coding standard developed by the Joint Video Experts Team (JVET) of ITU-T SG 16 WP 3 and ISO/IEC JTC 1/SC 29. In the VVC Draft, a picture is divided into one or more tile rows and one or more tile columns, and a tile is a sequence of CTUs that covers a rectangular region within a particular tile column and a particular tile row in the picture. The feature of tiles was mainly for parallel processing purposes, and tile partitioned rectangular slices forming subpictures may also be used in viewport based 360 degrees video applications. The processing order for tile partition of a picture is tile raster scan within the picture and CTU raster scan within a tile. Tiles break in-picture prediction dependencies as well as entropy decoding dependencies. A slice consists of an integer number of complete tiles or an integer number of consecutive complete CTU rows within a tile of a picture. The feature of slices is mainly used for subpicture level access and ultralow delay. Raster scan slice mode and rectangular slice mode are two slice structure modes supported in the VVC standard, indicated by a syntax element rect_slice_flag. Rectangular slices are always in a rectangular shape while raster scan slices may or may not be in a rectangular shape. In the raster scan slice mode, a slice contains a sequence of complete tiles of a picture in a tile raster scan order. Tiles within a raster scan slice are processed in a tile raster scan order within the raster scan slice. In the rectangular slice mode, a slice contains either a number of complete tiles that collectively form a rectangular region of the picture or a number of consecutive complete CTU rows of one tile that collectively form a rectangular region of the picture. Tiles within a rectangular slice are processed in a tile raster scan order with the rectangular region corresponding to that rectangular slice. Each subpicture in a picture contains one or more slices that collectively cover a rectangular region of the picture, and each subpicture contains multiple complete CTUs. Subpictures in a picture allow independent coding and extraction of a rectangular subset of a sequence of coded pictures for use cases like viewport-dependent 360 degrees video streaming optimization and region of interest applications. Subpictures allow motion vectors of a coding block pointing outside of the subpicture even when the subpicture is extractable, thus allowing padding at subpicture boundaries as picture boundaries.

Figure 3:
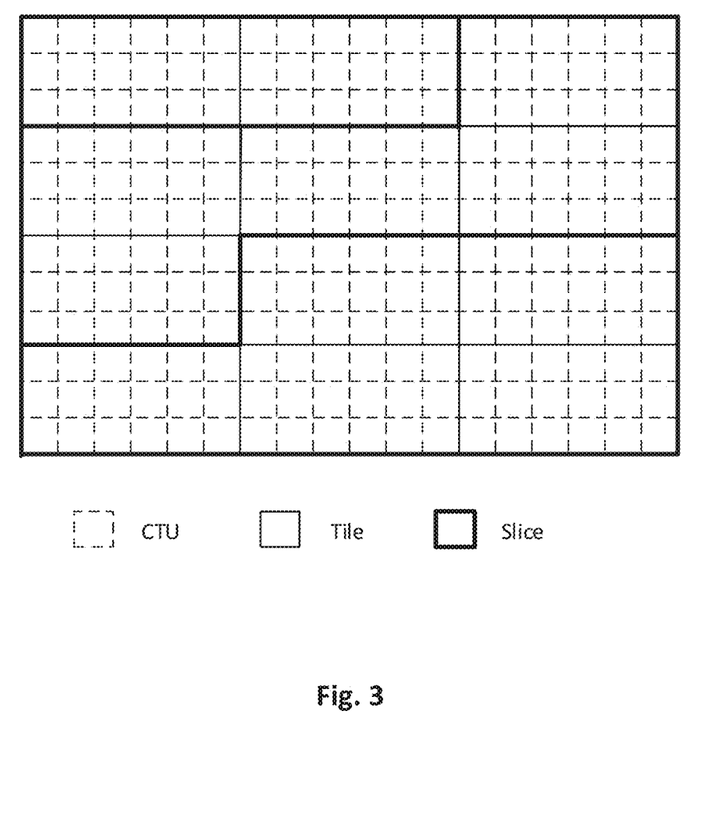
FIG. 3 illustrates an example of applying raster scan slice partitioning to divide a picture into 12 tiles and 3 raster scan slices.
Figure 4:
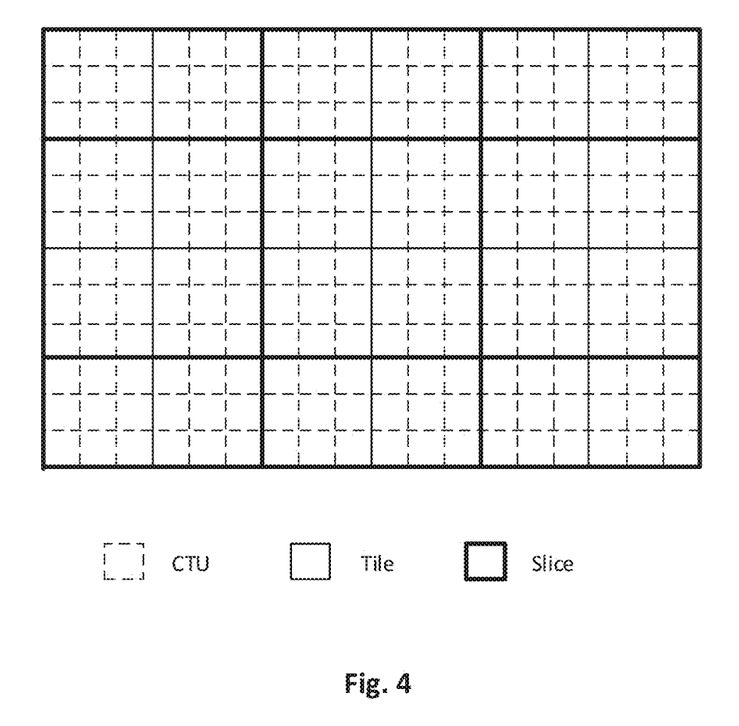
FIG. 4 illustrates an example of applying rectangular slice partitioning to divide a picture, into 24 tiles and 9 rectangular slices.
Figure 5:
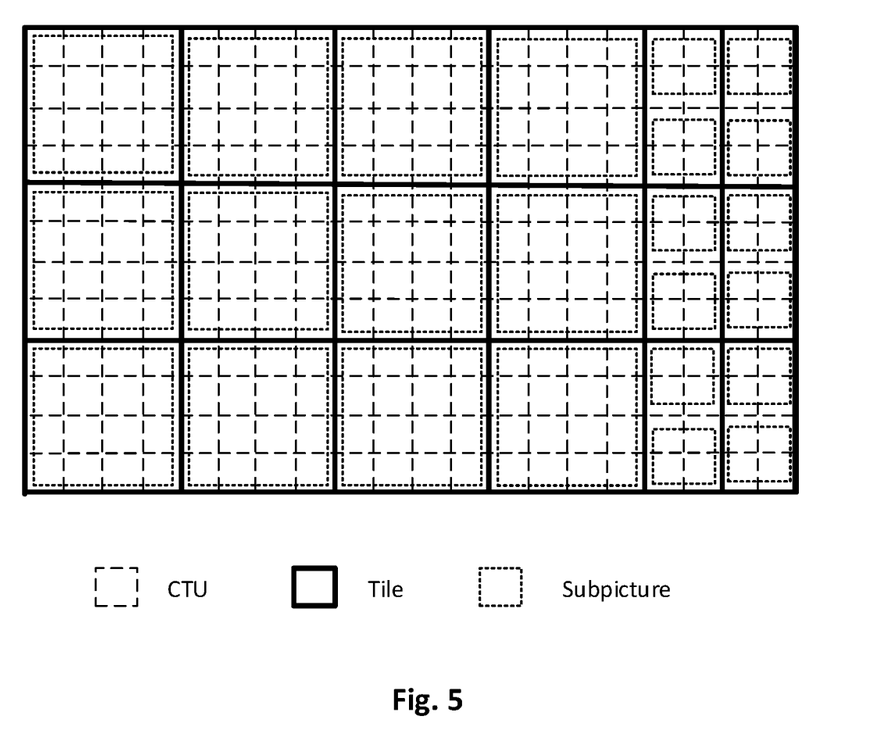
FIG. 5 illustrates an example of partitioning a picture into 18 tiles and 24 subpictures/slices.

FIG. 3 illustrates an example of tiles in raster scan slices, where a picture is divided into 12 tiles contained in 3 raster scan slices. There are 3 tile columns and 4 tile rows in the picture as shown in FIG. 2, and each tile consists of 18 CTUs. A first slice of the picture consists of the first 2 tiles in a tile raster scan order, a second slice consists of five consecutive tiles in the tile raster scan order, and a third slice consists of the remaining 5 tiles. FIG. 4 illustrates an example of tiles in rectangular slices, where the picture is divided into 24 tiles contained in 9 rectangular slices. There are 6 tile columns and 4 tile rows in this example. Except for the fourth, fifth, and sixth rectangular slices each having 4 tiles, all other rectangular slices are consisting of 2 tiles. FIG. 5 shows an example of subpicture partitioning of a picture, where the picture is partitioned into 18 tiles and 24 subpictures of varying dimensions. The tile boundaries are illustrated by bold lines and the subpicture boundaries are illustrated by dashed lines. In the example shown in FIG. 5, each subpicture contains only one slice.

BRIEF SUMMARY OF THE INVENTION

Embodiments of video processing methods for a video encoding or decoding system receive input video data associated with a current picture composed of multiple Coding Tree Units (CTUs) for encoding or decoding, determine a number of subpictures for partitioning the current picture, partition the current picture into one or more subpictures according to the number of subpictures, and encode or decode each subpicture in the current picture. Each subpicture contains multiple complete CTUs and boundaries of each subpicture are aligned with grids of the current picture in units of CTUs. The number of subpictures in the current picture is limited by an allowed maximum number of slices. Each subpicture in the current picture is encoded to generate a video bitstream or each subpicture in the current picture is decoded to generate decoded video.

In some embodiments, the number of subpictures in the current picture is indicated by a syntax element sps_num_subpics_minus1 signaled in or parsed from a Sequence Parameter Set (SPS). Each picture in a Coded Layered Video Sequence (CLVS) referred to the SPS is determined to be partitioned into multiple subpictures when the syntax element sps_num_subpics_minus1 is greater than 0. When the syntax element sps_num_subpics_minus1 is equal to 0, each picture in a CLVS referred to the SPS is not partitioned into multiple subpictures, that is, each picture contains only one subpicture.

A subpicture layout for the current picture is specified based on a grid of the current picture in units of CTUs according to some embodiments. In one embodiment, the number of subpictures in the current picture is limited by a minimum of a number of CTUs in the current picture and the allowed maximum number of slices. In another embodiment, the number of subpictures is only limited by the allowed maximum number of slices. The allowed maximum number of slices may be derived by a syntax element parsed from the video bitstream or a syntax element indicating the allowed maximum number of slices is signaled in the video bitstream. In one embodiment, the allowed maximum number of slices indicates a maximum number of slices each picture is allowed to be partitioned into. In another embodiment, the allowed maximum number of slices is a maximum number of slices each Access Unit (AU) is allowed to be partitioned into. The AU is a set of PU that belong to different layers and contains coded pictures associated with a same time for output from a Decoded Picture Buffer (DPB).

The current picture is partitioned into slices, where each slice contains a number of complete CTUs, and each subpicture in the current picture contains one or more slices that collectively cover a rectangular region of the current picture.

In some embodiments, a syntax element indicating whether subpicture ID mapping information is present in a Picture Parameter Set (PPS) referred by the current picture is determined, and when the syntax element indicates subpicture ID mapping information is present in the PPS, the current picture is inferred to be partitioned by rectangular slices. In one embodiment, a presence of a syntax element indicating whether the current picture is partitioned in rectangular slices or raster scan slices is conditioned on the syntax element indicating whether subpicture ID mapping information is present.

In one embodiment, one or more reference pictures are determined for inter coding the current picture. Each reference picture has a same CTU size as the current picture when the current picture is partitioned into multiple subpictures and the reference picture is not an Inter Layer Reference Picture (ILRP) containing one subpicture. Each reference picture for inter coding the current picture is a reference picture in a same layer as the current picture or an ILRP in a different layer as the current picture according to an embodiment. A SPS referred to by the current picture and a SPS referred to by each reference picture have a same value of sps_log 2_ctu_size_minus5 for inter-layer coding.

Aspects of the disclosure further provide an apparatus for a video encoding or decoding system. Some embodiments of the apparatus receive input video data associated with a current picture, wherein the current picture is composed of a plurality of CTUs for encoding or decoding, determine a number of subpictures for the current picture, partition the current picture into one or more subpictures according to the number of subpictures, and encode or decode each subpicture in the current picture to generate a video bitstream or decoded video. The number of subpictures in the current picture is limited by an allowed maximum number of slices. A non-transitory computer readable medium storing program instruction causing a processing circuit of an apparatus to perform a video processing method is disclosed. The video processing method includes receiving input video data of a current picture composing multiple CTUs, determining a number of subpictures for the current picture, partitioning the current picture into subpictures, and encode or decode each of the subpictures in the current picture. The number of subpictures in the current picture is limited by an allowed maximum number of slices.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Upper Limit on the Number of Subpictures According to the VVC standard, a subpicture contains one or more slices that collectively cover a rectangular region of a picture. The video encoder can control whether in-loop filtering is applied across the subpicture boundaries individually for each subpicture. The subpictures allow motion vectors of a coding block pointing outside of the subpicture even when the subpicture is extractable by applying same padding at subpicture boundaries. A Sequence Parameter Set (SPS) level syntax element sps_num_subpics_minus1 signaled in a SPS is used to indicate a number of subpictures in each picture in the Coded Layered Video Sequence (CLVS) referring to the SPS. Each picture referring to the SPS is not partitioned into multiple subpictures when this SPS level syntax element sps_number_subpics_minus1 is equal to 0. The position and size of each subpicture for pictures referred to by the SPS may also be signaled in the SPS, where the subpicture layout in a picture is specified based on the grid of the current picture in units of CTUs. In the VVC Draft, a number of subpictures is upper bounded by a number of CTUs in a coded picture. However, each subpicture contains at least one complete slice, a number of coded slices shall be equal to or greater than a number of subpictures in the coded picture. According to some embodiments of the present invention, a number of subpictures of the coded picture is limited to be not greater than an allowed maximum number of slices under the specified profile and level constraint. Each subpicture contains multiple complete CTUs and boundaries of each subpicture are aligned with grids of the coded picture in units of CTUs. An exemplary embodiment of the syntax and semantic modifications to the VVC Draft 9 with modified parts marked by underlines are illustrated in the followings.

7.4.3.3 Sequence Parameter Set RBSP Semantics sps_num_subpics_minus1 plus 1 specifies the number of subpictures in each picture in the CLVS. The value of sps_num_subpics_minus1 shall be in the range of 0 to Min (MaxSlicesPerPicture, Ceil (sps_pic_width_max_in_luma_samples/CtbSizeY)*Ceil (sps_pic_height_max_in_luma_samples/CtbSizeY))−1, inclusive. When not present, the value of sps_num_subpics_minus1 is inferred to be equal to 0.

The value of an allowed maximum number of slices MaxSlicePerPicture is determined by Level limit and is specified in a Table in VVC Draft 9. In this exemplary embodiment, the number of subpictures in a picture is constrained to be between 1 to the minimum of a maximum number of slices per picture and a number of CTUs in the picture. Typically, the number of CTUs in a picture is much more than the maximum number of slices per picture, thus in another embodiment, the number of subpictures in a picture is only constrained by the maximum number of slices. For example, the number of subpictures must be in the range of 1 to a maximum number of slices per picture. In another embodiment, the number of subpictures must be in the range of 1 to a maximum number of slices per Access Unit (AU), where each AU is a set of PUs that belong to different layers and contain coded picture associated with the same time for output from a Decoded Picture Buffer (DPB). The value of the maximum number of slices per AU may also be determined by Level limit and may be specified in a Table.

The number of subpictures in a coded picture is indicated by a syntax element, for example a SPS level syntax element sps_num_subpics_minus1 signaled in or parsed from a SPS referred to by the coded picture. When the syntax element sps_num_subpics_minus1 signaled in or parsed from a SPS is equal to 0, each picture in a Coded Layered Video Sequence (CLVS) referred to the SPS contains only one subpicture. When the syntax element sps_num_subpics_minus1 is greater than 0, each picture in a CLVS referred to the SPS is partitioned into more than one subpicture.

In one embodiment, a subpicture layout for a coded picture is specified based on grids of the coded picture in units of CTUs. A coded picture is partitioned into slices, and each slice is consisting of an integer of complete CTUs. Each subpicture in a coded picture contains one or more rectangular slices that collectively cover a rectangular region of the coded picture.

Figure 6:
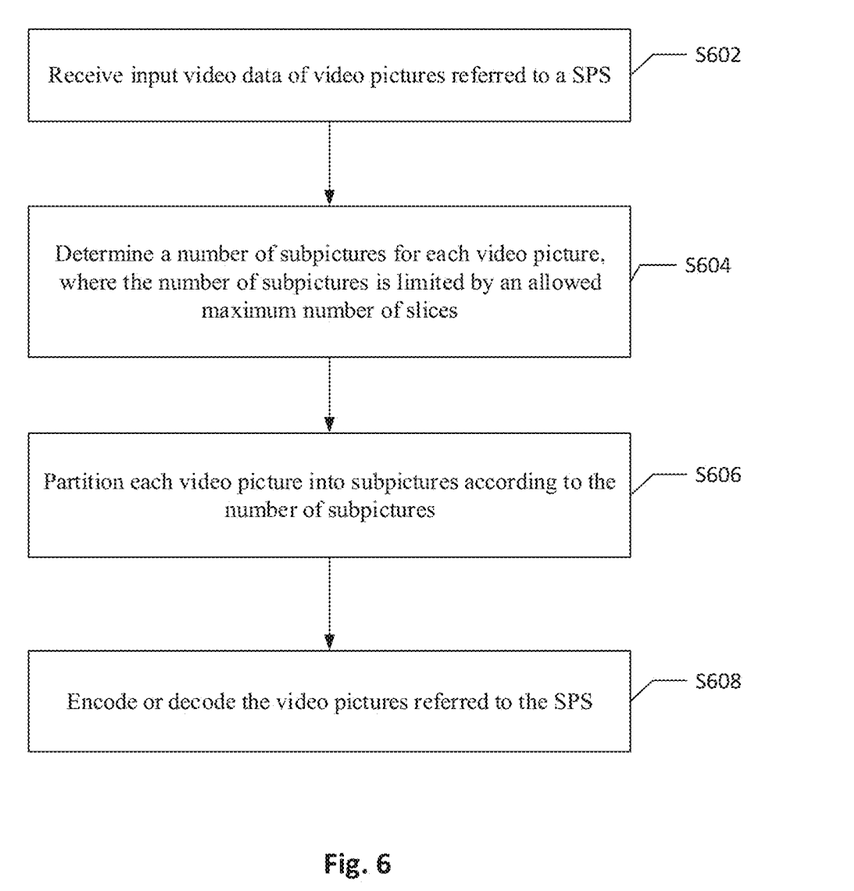
FIG. 6 is a flowchart of processing video data in pictures referred to a SPS according to an embodiment of the present invention.

Representative Flowchart for an Embodiment of Present Invention FIG. 6 is a flowchart illustrating an embodiment of a video encoding or decoding system processing input video data by limiting a number of subpictures according to an allowed maximum number of slices. The video encoding or decoding system receives input video data of video pictures referred to a SPS in step S602, determines a number of subpictures for each video picture in step S604. The number of subpictures for each video picture is limited by an allowed maximum number of slices. In steps S606, each video picture is partitioned into subpictures according to the number of subpictures and a subpicture layout. The video encoding system encodes the subpictures in each video picture to generate a video bitstream or the video decoding system decodes the subpictures in each video picture to generate decoded video in step S608.

Signaling pps_rect_slice_flag In the VVC Draft, when a Picture Parameter Set (PPS) level syntax element pps_subpic_id_mapping_present_flag is equal to 1, it indicates rectangular slices shall be used for partitioning the coded picture referring to the PPS and the value of a PPS level syntax element pps_rect_slice_flag shall be equal to 1. The rectangular slice mode is used to partition the coded picture when pps_rect_slice_flag is equal to 1, otherwise the raster scan slice mode is used when pps_rect_slice_flag is equal to 0. In some embodiments of the present invention, a presence of a syntax element indicating whether the current picture is partitioned in rectangular slices or raster scan slices is conditioned on the syntax element indicating whether subpicture ID mapping information is present in the PPS. For example, the presence of the PPS level syntax element pps_rect_slice_flag is further conditioned on the syntax element pps_subpic_id_mapping_present_flag. That is, the syntax element pps_rect_slice_flag is inferred to be equal to 1 when the syntax element pps_subpic_id_mapping_present_flag is equal to 1, indicating the picture is partitioned into rectangular slices when subpicture ID mapping information is present in the PPS. An exemplary embodiment of syntax and sematic modifications to the VVC Draft 9 with modified parts written in bold are as follows:

|  | Descriptor |
|---|---|
| pic_parameter_set_rbsp( ) { |  |
|   pps_pic_parameter_set_id | u(6) |
|   pps_seq_parameter_set_id | u(4) |
|   ... |  |
|   pps_no_pic_partition_flag | u(1) |
|   pps_subpic_id_mapping_present_flag | u(1) |
|   if( pps_subpic_id_mapping_present_flag ) { |  |
|     if( !pps_no_pic_partition_flag ) |  |
|       pps_num_subpics_minus1 | ue(v) |
|     pps_subpic_id_len_minus1 | ue(v) |
|     for( i = 0; i <= pps_num_subpic_minus1; i++ ) |  |
|       pps_subpic_id[ i ] | u(v) |
|   } |  |
|   if( !pps_no_pic_partition_flag ) { |  |
|     pps_log2_ctu_size_minus5 | u(2) |
|     pps_num_exp_tile_columns_minus1 | ue(v) |
|     pps_num_exp_tile_rows_minus1 | ue(v) |
|     for( i = 0; i <= pps_num_exp_tile_columns_minus1; i++ ) |  |
|       pps_tile_column_width_minus1[ i ] | ue(v) |
|     for( i = 0; i <= pps_num_exp_tile_rows_minus1; i++ ) |  |
|       pps_tile_row_height_minus1[ i ] | ue(v) |
|     if( NumTilesInPic > 1 ) { |  |
|       pps_loop_filter_across_tiles_enabled_flag | u(1) |
|       if( !pps_subpic_id_mapping_present_flag ) |  |
|         pps_rect_slice_flag | u(1) |
|     } |  |
|     ... |  |
|   } |  |
|   ... |  |
| } |  |

Inter-layer Coding with Subpictures In the VVC Draft, information on subpicture layout is coded in the SPS for coded pictures referring to the SPS. It is a requirement of the bitstream conformance that the reference picture and the current picture shall have the same subpicture layout when the syntax element sps_num_subpics_minus1 is greater than 0 for the SPS referred to by an inter-layer reference picture. The value of the SPS syntax element sps_log 2_ctu_size_minus5 is related to the scaling factor of subpicture layout. In an embodiment of the present invention, each reference picture used for inter coding a current picture has a same CTU size as the current picture when the current picture is partitioned into multiple subpictures and the reference picture is not an ILRP containing one subpicture. Each reference picture may be a reference picture in a same layer as the current picture or an ILRP in a different layer as the current picture. For example, the SPS referred to by the current picture and the SPS referred to by the reference picture shall have the same value of sps_log 2_ctu_size_minus5 for inter coding or inter-layer coding when the reference picture is not an ILRP containing one subpicture. The syntax element sps_log 2_ctu_size_minus5 indicates a CTU size. In one embodiment, at least one reference picture having a same CTU size as the current picture is an ILRP for inter layer coding the current picture. For an ILRP referring to the SPS with sps_num_subpics_minus1 greater than 0, the ILRP is eligible for being added to an active reference list entry only when the reference-layer SPS and the current-layer SPS have the same value of sps_log 2_ctu_size_minus5. An exemplary embodiment of the syntax and semantic modifications to the VVVC Draft 9 with modified parts marked by underlines are as follows:

7.4.3.3 Sequence Parameter Set RBSP Semantics
sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. When not present, the value of sps_subpic_treated_as_pic_flag[i] is inferred to be equal to 1.

When sps_num_subpics_minus1 is greater than 0 and sps_subpic_treated_as_pic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:

For each AU in targetAuSet, all pictures of the layers in targetLayerSet shall have the same value of pps_pic_width_in_luma_samples and the same value of pps_pic_height_in_luma_samples.

All the SPSs referred to by the layers in targetLayerSet shall have the same value of sps_log 2_ctu_size_minus5 and the same value of sps_num_subpics_minus1 and shall have the same values of sps_subpic_ctu_top_left_x[j], sps_subpic_ctu_top_left_y[j], sps_subpic_width_minus1 [j], sps_subpic_height_minus1 [j], and sps_subpic_treated_as_pic_flag[j], respectively, for each value of j in the range of 0 to sps_num_subpics_minus1, inclusive.

For each AU in targetAuSet, all pictures of the layers in targetLayerSet shall have the same value of SubpicIdVal[j] for each value of j in the range of 0 to sps_num_subpics_minus1, inclusive.

8.3.2 Decoding Process for Reference Picture Lists Construction

. . .

When vps_independent_layer_flag[GeneralLayerIdx[nuh_layer_id]] is equal to 0 and sps_num_subpics_minus1 is greater than 0, either of the following two conditions (but not both) shall be true:

The picture referred to by each active entry in RefPicList[0] or RefPicList[1] has the same subpicture layout as the current picture (i.e., the SPSs referred to by that picture and the current picture have the same value of sps_log 2_ctu_size_minus5 and the same value of sps_num_subpics_minus1 and the same values of sps_subpic_ctu_top_left_x[j], sps_subpic_ctu_top_left_y[j], sps_subpic_width_minus1[j], and sps_subpic_height_minus1[j], respectively, for each value of j in the range of 0 to sps_num_subpics_minus1, inclusive).

The picture referred to by each active entry in RefPicList[0] or RefPicList[1] is an ILRP for which the value of sps_num_subpics_minus1 is equal to 0.

Exemplary Video Encoder and Video Decoder Implementing Present Invention Embodiments of the present invention may be implemented in encoders and/or decoders. For example, the disclosed methods may be implemented in one or a combination of an entropy encoding module and a high-level syntax encoding module of an encoder, and/or an entropy decoding module and a high-level syntax decoding module of a decoder. Alternatively, any of the disclosed methods may be implemented as a circuit coupled to the entropy encoding module or the high-level syntax encoding module of the encoder and/or the entropy decoding module or the high-level syntax decoding module of the decoder, so as to provide the information needed by any of the modules. The encoders and decoders may be video encoders and video decoders or image encoders and image decoders. When the foregoing proposed method is implemented in image encoders and/or image decoders, the resulting bitstream corresponds to one coded frame only using intra-picture prediction. The video encoders have to follow the foregoing syntax design so as to generate a legal video bitstream, and the video decoders are able to decode the video bitstream correctly only if the parsing process is complied with the foregoing syntax design. When any syntax element is skipped in the video bitstream, the video encoders and decoders define the value of the syntax element as an inferred value to guarantee the encoding and decoding results are matched.

Figure 7:
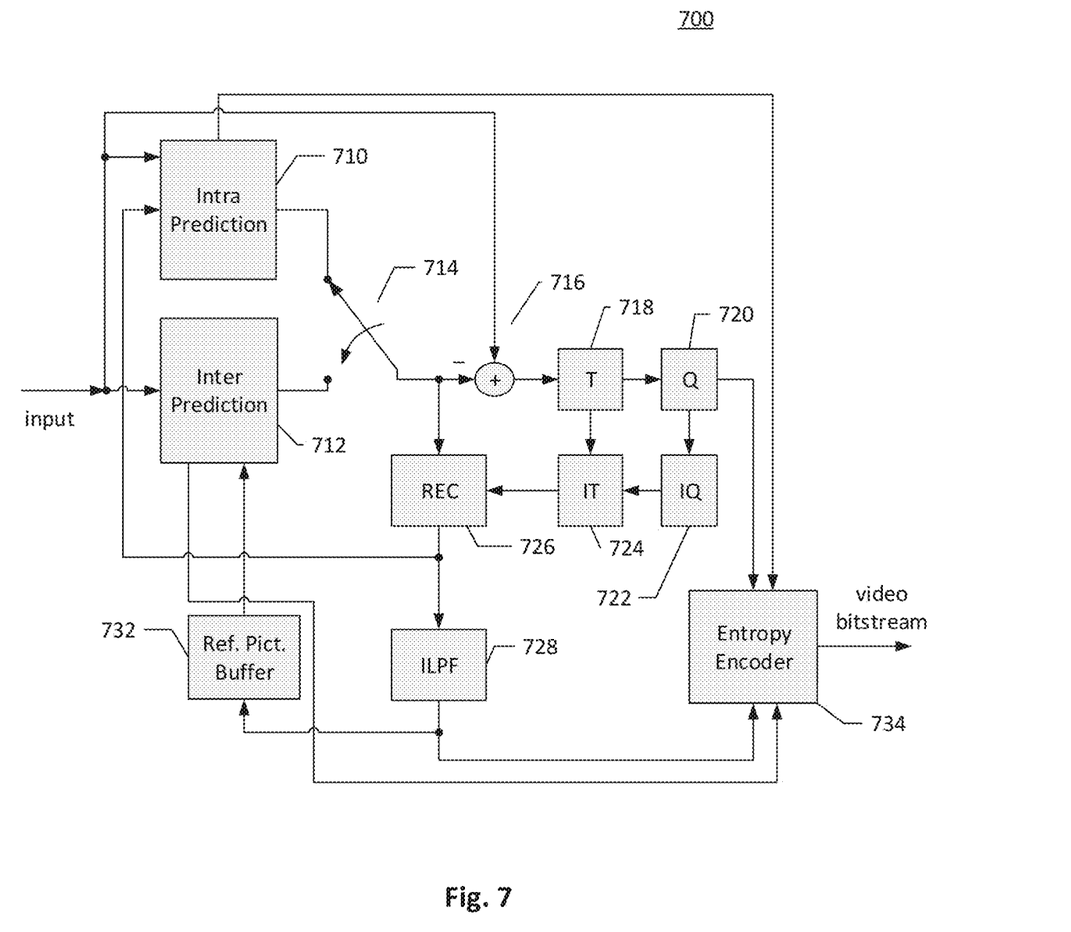
FIG. 7 illustrates an exemplary system block diagram for a video encoding system incorporating the video processing method according to embodiments of the present invention.

FIG. 7 illustrates an exemplary system block diagram for a Video Encoder 700 implementing one or more of the various embodiments of the present invention. The video Encoder 700 receives input video data of a current picture composed of multiple CTUs. Each CTU consists of one block of luma samples together with one or more corresponding blocks of chroma samples. The current picture is partitioned into one or more subpictures, each subpicture includes an integer number of complete CTUs. An Intra Prediction module 710 provides intra predictors based on reconstructed video data of the current picture. An Inter Prediction module 712 performs Motion Estimation (ME) and Motion Compensation (MC) to provide inter predictors based on referencing video data from other picture or pictures. In some embodiments of the present invention, a number of subpictures in the current picture is limited by an allowed maximum number of slices. The number of subpictures in the current picture is constrained by a range between 1 to an allowed maximum number of slices. Either the Intra Prediction module 710 or Inter Prediction module 712 supplies a selected predictor of a current block within a CTU in the current picture using a switch 714 to an Adder 716 to form residues by subtracting the selected predictor from original video data of the current block. For example, the current block is a Coding Unit (CU). The residues of the current block are further processed by a Transformation module (T) 718 followed by a Quantization module (Q) 720. The transformed and quantized residual signal is then encoded by Entropy Encoder 734 to form a video bitstream. The transformed and quantized residual signal of the current block is processed by an Inverse Quantization module (IQ) 722 and an Inverse Transformation module (IT) 724 to recover the prediction residues. As shown in FIG. 7, the residues are recovered by adding back to the selected predictor at a Reconstruction module (REC) 726 to produce reconstructed video data. The reconstructed video data may be stored in a Reference Picture Buffer (Ref. Pict. Buffer) 732 and used for prediction of other pictures. The reconstructed video data from the REC 726 may be subject to various impairments due to the encoding processing, consequently, at least one In-loop Processing Filter (ILPF) 728 is conditionally applied to the reconstructed video data before storing in the Reference Picture Buffer 732 to further enhance picture quality. A deblocking filter is an example of the ILPF 728. Syntax elements are provided to an Entropy Encoder 734 for incorporation into the video bitstream.

Figure 8:
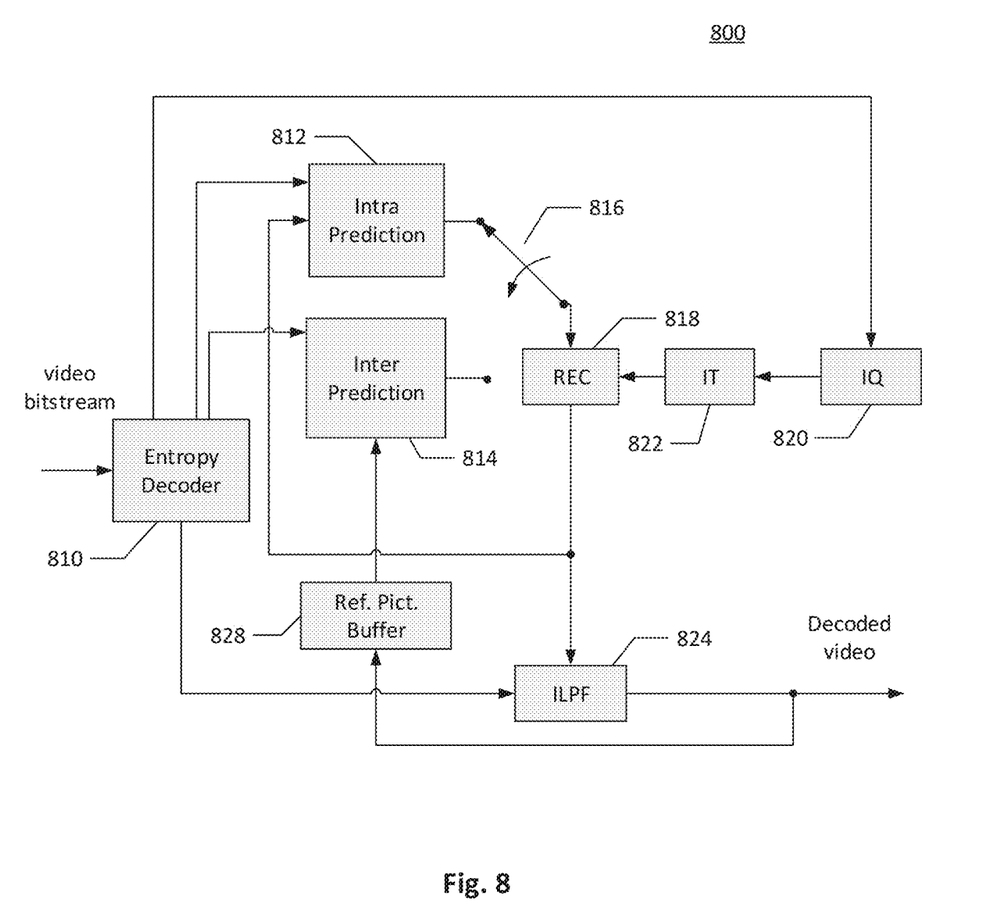
FIG. 8 illustrates an exemplary system block diagram for a video decoding system incorporating the video processing method according to embodiments of the present invention.

A corresponding Video Decoder 800 for the Video Encoder 700 of FIG. 7 is shown in FIG. 8. The video bitstream encoded by a video encoder is the input to the Video Decoder 800 and is decoded by an Entropy Decoder 810 to parse and recover the transformed and quantized residual signal and other system information of a current picture. The decoding process of the Decoder 800 is similar to the reconstruction loop at the Encoder 700, except the Decoder 800 only requires motion compensation prediction in an Inter Prediction module 814. A current picture partitioned into one or more subpictures is received by the Entropy Decoder 810, where the current picture is composed of multiple CTUs. Each block of each CTU in the current picture is decoded by either an Intra Prediction module 812 or Inter Prediction module 814. A Switch 816 selects an intra predictor from the Intra Prediction module 812 or Inter predictor from the Inter Prediction module 814 according to decoded mode information. In some embodiments, a number of subpictures is limited by an allowed maximum number of slices. Information associated with the allowed maximum number of slices is parsed from the video bitstream according to some embodiments. The transformed and quantized residual signal is recovered by an Inverse Quantization module (IQ) 820 and an Inverse Transformation module (IT) 822. The IQ module 820 is also called a de-quantization module. The recovered residual signal is reconstructed by adding back the predictor in a Reconstruction (REC) module 818 to produce reconstructed video. The reconstructed video is further conditionally processed by at least one In-loop Processing Filter (ILPF) 824 to generate final decoded video. A deblocking filter is one example of the ILPFs 824. If the currently decoded picture is a reference picture, the reconstructed video of the currently decoded picture is also stored in a Reference Picture Buffer (Ref. Pict. Buffer) 828 for later pictures in decoding order.

Various components of the Video Encoder 700 and Video Decoder 800 in FIG. 7 and FIG. 8 may be implemented by hardware components, one or more processors configured to execute program instructions stored in a memory, or a combination of hardware and processor. For example, a processor executes program instructions to control restricting a number of subpictures according to an allowed maximum number of slices. The processor is equipped with a single or multiple processing cores. In some examples, the processor executes program instructions to perform functions in some components in the Encoder 700 and Decoder 800, and the memory electrically coupled with the processor is used to store the program instructions, information corresponding to the reconstructed images of blocks, and/or intermediate data during the encoding or decoding process. In some examples, the Video Encoder 700 may signal information by including one or more syntax elements in a video bitstream, and the corresponding Video Decoder 800 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 7 and 8, the Encoder 700 and Decoder 800 may be implemented in the same electronic device, so various functional components of the Encoder 700 and Decoder 800 may be shared or reused if implemented in the same electronic device. For example, one or more of the Reconstruction module 726, Inverse Transformation module 724, Inverse Quantization module 722, In-loop Processing Filter 728, and Reference Picture Buffer 732 in FIG. 7 may also be used to function as the Reconstruction module 818, Inverse Transformation module 822, Inverse Quantization module 820, In-loop Processing Filter 824, and Reference Picture Buffer 828 in FIG. 8, respectively.

Embodiments of more efficient video processing methods may be implemented in a circuit integrated into a video compression chip or program code integrated into video compression software to perform the processing described above. For examples, encoding or decoding the current picture may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method for coding pictures in a video encoding or decoding system, comprising:
   receiving input video data associated with a current picture, wherein the current picture is composed of a plurality of Coding Tree Units (CTUs) for encoding or decoding;
   determining a number of subpictures for the current picture;
   partitioning the current picture into one or more subpictures according to the number of subpictures, wherein each subpicture contains a plurality of complete CTUs and boundaries of each subpicture are aligned with grids of the current picture in units of CTUs, wherein the number of subpictures in the current picture is limited by an allowed maximum number of slices, wherein the number of subpictures in the current picture is limited to be not greater than the allowed maximum number of slices under a specified profile and level constraint, wherein the allowed maximum number of slices is a maximum number of slices each Access Unit (AU) allowed to be partitioned into, wherein the AU is a set of Prediction Units (PUs) that belong to different layers and contains coded pictures associated with a same time for output from a Decoded Picture Buffer (DPB); and
   encoding the one or more subpictures in the current picture to generate a video bitstream or decoding the one or more subpictures in the current picture to generate decoded video, wherein the allowed maximum number of slices is derived by a syntax element parsed from the video bitstream or a syntax element indicating the allowed maximum number of slices is signaled in the video bitstream.

2. The method of claim 1, wherein the number of subpictures in the current picture is indicated by a syntax element sps_num_subpics_minus1 signaled in or parsed from a Sequence Parameter Set (SPS).

3. The method of claim 2, wherein each picture in a Coded Layered Video Sequence (CLVS) referred to the SPS is determined to be partitioned into a plurality of subpictures when the syntax element sps_num_subpics_minus1 is greater than 0.

4. The method of claim 1, wherein a subpicture layout for the current picture is specified based on a grid of the current picture in units of CTUs.

5. The method of claim 1, wherein the number of subpictures in the current picture is limited by a minimum of a number of CTUs in the current picture and the allowed maximum number of slices.

6. The method of claim 1, wherein the allowed maximum number of slices indicates a maximum number of slices each picture allowed to be partitioned into.

7. The method of claim 1, wherein the current picture is partitioned into slices each containing a number of complete CTUs, wherein each subpicture in the current picture contains one or more slices that collectively cover a rectangular region of the current picture.

8. The method of claim 1, further comprising determining a syntax element indicating whether subpicture ID mapping information is present in a Picture Parameter Set (PPS) referred by the current picture, and inferring rectangular slices are used for partitioning the current picture when the syntax element indicates subpicture ID mapping information is present in the PPS.

9. The method of claim 8, wherein a presence of a syntax element indicating whether the current picture is partitioned in rectangular slices or raster scan slices is conditioned on the syntax element indicating whether subpicture ID mapping information is present in the PPS.

10. The method of claim 1, further comprising determining one or more reference pictures for inter coding the current picture, wherein each reference picture has a same CTU size as the current picture when the current picture is partitioned into a plurality of subpictures and the reference picture is not an Inter Layer Reference Picture (ILRP) containing one subpicture.

11. The method of claim 10, wherein each reference picture for inter coding the current picture is a reference picture in a same layer as the current picture or an ILRP in a different layer as the current picture.

12. The method of claim 11, wherein a Sequence Parameter Set (SPS) referred to by the current picture and a SPS referred to by each reference picture have a same value of sps_log 2_ctu_size_minus5 for inter-layer coding, wherein sps_log 2_ctu_size_minus5 indicates a CTU size.

13. An apparatus of video processing method in a video encoding or decoding system, the apparatus comprising one or more electronic circuits configured for:
receiving input video data associated with a current picture, wherein the current picture is composed of a plurality of Coding Tree Units (CTUs) for encoding or decoding;
determining a number of subpictures for the current picture;
partitioning the current picture into one or more subpictures according to the number of subpictures, wherein each subpicture contains a plurality of complete CTUs and boundaries of each subpicture are aligned with grids of the current picture in units of CTUs, wherein the number of subpictures in the current picture is limited by an allowed maximum number of slices, wherein the number of subpictures in the current picture is limited to be not greater than the allowed maximum number of slices under a specified profile and level constraint, wherein the allowed maximum number of slices is a maximum number of slices each Access Unit (AU) allowed to be partitioned into, wherein the AU is a set of Prediction Units (PUs) that belong to different layers and contains coded pictures associated with a same time for output from a Decoded Picture Buffer (DPB); and
encoding the one or more subpictures in the current picture to generate a video bitstream or decoding the one or more subpictures in the current picture to generate decoded video, wherein the allowed maximum number of slices is derived by a syntax element parsed from the video bitstream or a syntax element indicating the allowed maximum number of slices is signaled in the video bitstream.

14. A non-transitory computer readable medium storing program instruction causing a processing circuit of an apparatus to perform a video processing method for pictures partitioned into subpictures, and the method comprising:
receiving input video data associated with a current picture, wherein the current picture is composed of a plurality of Coding Tree Units (CTUs) for encoding or decoding;
determining a number of subpictures for the current picture;
partitioning the current picture into one or more subpictures according to the number of subpictures, wherein each subpicture contains a plurality of complete CTUs and boundaries of each subpicture are aligned with grids of the current picture in units of CTUs, wherein the number of subpictures in the current picture is limited by an allowed maximum number of slices, wherein the number of subpictures in the current picture is limited to be not greater than the allowed maximum number of slices under a specified profile and level constraint, wherein the allowed maximum number of slices is a maximum number of slices each Access Unit (AU) allowed to be partitioned into, wherein the AU is a set of Prediction Units (PUs) that belong to different layers and contains coded pictures associated with a same time for output from a Decoded Picture Buffer (DPB); and
encoding the one or more subpictures in the current picture to generate a video bitstream or decoding the one or more subpictures in the current picture to generate decoded video, wherein the allowed maximum number of slices is derived by a syntax element parsed from the video bitstream or a syntax element indicating the allowed maximum number of slices is signaled in the video bitstream.

* * * * *